United States Patent [19]
Huber et al.

[11] Patent Number: 6,008,591
[45] Date of Patent: Dec. 28, 1999

[54] CIRCUIT FOR STARTING AN HID LAMP

[75] Inventors: Andreas Huber, Maisach; Peter Niedermeier, Munich, both of Germany

[73] Assignee: Patent-Treuhand-Gesellschaft fuer elektrische Gluehlampen mbH, Munich, Germany

[21] Appl. No.: 09/045,396

[22] Filed: Mar. 20, 1998

[30] Foreign Application Priority Data

Mar. 24, 1997 [DE] Germany ............... 197 12 258

[51] Int. Cl.⁶ ............................................. H05B 37/02
[52] U.S. Cl. ................ 315/219; 315/209 R; 315/224; 315/276; 315/DIG. 5
[58] Field of Search .................. 315/DIG. 5, 276, 315/224, 219, 209 R; 327/109; 363/98

[56] References Cited

U.S. PATENT DOCUMENTS

| | | | |
|---|---|---|---|
| 4,472,661 | 9/1984 | Culver | 315/276 |
| 5,404,287 | 4/1995 | Poumey | 363/21 |
| 5,463,287 | 10/1995 | Kurihara et al. | 315/308 |
| 5,491,388 | 2/1996 | Nobuyuki et al. | 315/308 |
| 5,747,944 | 5/1998 | Harada | 315/241 P |
| 5,831,394 | 11/1998 | Huber et al. | 315/224 |

*Primary Examiner*—Don Wong
*Assistant Examiner*—Tuyet Vo
*Attorney, Agent, or Firm*—Carlo S. Bessone

[57] ABSTRACT

Proposed for the purpose of starting a high-pressure discharge lamp is a circuit which in the conventional way comprises a starting transformer (12) whose secondary side is connected to the lamp to be started and whose primary side is connected to a circuit triggering the starting pulse, the circuit triggering the starting pulse generating starting pulses with a pulse duration of less than 0.5 μs and a repetition frequency of at least 2 kHz. An IGBT (Insulated Gate Bipolar Transistor) (14) is preferably used as switching element.

10 Claims, 5 Drawing Sheets

CIRCUIT FOR STARTING AN HID LAMP

TECHNICAL FIELD

The present invention relates to a circuit for starting a high-pressure discharge lamp, having a starting transformer whose secondary side is connected to the lamp to be started and whose primary side is connected to a circuit triggering the starting pulse.

BACKGROUND OF THE INVENTION

Fundamentally, starting circuits for high-pressure discharge lamps can be operated together with two sorts of ballasts: conventional ballasts (KVG) and electronic ballasts (EVG).

In the case of KVGs, it is mostly an iron-cored inductor which is used for current limitation of a started high-pressure discharge lamp, while the current limitation is controlled electronically in the case of EVGs.

Known high-voltage starting devices frequently use a circuit comprising a starting transformer whose secondary side is connected to the lamp to be started and whose primary side is connected to a circuit triggering the starting pulse. Such a circuit is disclosed, for example, in DE-A 195 31 622, in which the switch is implemented as a SIDAC, which for its part can be controlled via a transistor. A further example is the application PCT/IB96/00051, published under WO 96/25022. Here, as well, the switch is a SIDAC.

It is typically required in many countries as the standard for acceptably starting a high-pressure discharge lamp that the starting pulse is 2 $\mu$s wide in conjunction with a voltage of 3.6 kV. This starting pulse is to be repeated with each system halfwave, and this corresponds to a repetition frequency of 100 to 120 Hz. A large inductance is required in order to generate such a starting pulse, and this necessitates large dimensions of the starting transformer. In addition, this stipulation is only a minimum requirement, which is necessary for successfully starting the high-pressure lamp.

The requirements made of a starting device with these specifications cannot in practice be fulfilled directly, since both in the case of conventional ballasts and, in particular, in the case of electronic ballasts, suitable inductances are high and the outlay on circuitry is not inconsiderable. Firstly, in the case of electronic ballasts it is necessary for a starting transformer to be small because of integration into a circuit. Secondly, said transformer may have only a small inductance, in order to avoid noise during remagnetization of a core in low-frequency operation (LF operation), and to deform the shape of the curve of the output voltage as little as possible, because in the case of electronic ballasts the shape of the curve of the output voltage is mostly that of a square wave. Thirdly, the price for such a starting transformer is relatively high. When generating the starting pulses by means of the switching elements used to date (mostly SIDACs), a wide scatter of the starting voltage occurs owing to tolerances in these switching elements, in particular in SIDACs. This fact is taken into account by purposely overdimensioning the switching elements or by specifically selecting the components used. Only relatively low repetition frequencies can be achieved using SIDACs, and moreover their response voltage is problematic.

If it is desired to drop below 2 $\mu$s for the starting pulse width, in accordance with the above requirements the time between the individual pulses is to be shortened to less than 300 $\mu$s, and this corresponds to a repetition frequency of approximately 3 kHz.

As experiments have shown, the switching elements, such as spark gap and SIDACs, so far employed in conjunction chiefly with EVGs for starting high-pressure discharge lamps are suitable only to a limited extent for such short starting pulses. It has been found that turning-on delays of up to 10 s occur when such switching elements are used for lamps which are difficult to start.

SUMMARY OF THE INVENTION

It is therefore the object of the present invention to make available a starting circuit by means of which it is possible reliably to start even lamps of the generic concept which are poor in starting.

This object is achieved by virtue of the fact that in the case of the starting circuit according to the invention, chiefly in conjunction with an EVG, the starting pulse repetition frequency is raised to at least 2 kHz, the pulse width at 3.6 kV starting voltage being less than 0.5 $\mu$s. This method combines the advantages of resonance starting, in which, after all, high-voltage pulses are generated in rapid sequence (up to more than 100 kHz), with the low power consumption of pulse starting. The starting circuit presented here is neutral in cost with respect to the previous methods. It requires little space, and thus there is the possibility of integration. It can be switched on and off simply, has a long service life because of the semiconductor switch employed and is independent of temperature (in the usual range of operating temperature). The level of the starting voltage is dependent only on the charging voltage made available, which is mostly electronically regulated in the case of EVGs.

This starting circuit can also be designed symmetrically, that is to say an opposite pulse is available at the two lamp terminals. This is achieved by virtue of the fact that the previous single secondary winding is subdivided into two windings.

A further application is to be seen in starting which goes beyond the voltage of 5 kV required for "cold starting" and, in some circumstances, even permits hot starting, in which a starting voltage of up to over 20 kV is required.

This starting is suitable, in particular, for integrated starting circuits which are fitted directly to the high-pressure lamp, but is also suitable for an independent starting device which is used as a substitute for the KVG starting devices previously used.

The present invention has great advantages by comparison with the components previously used for starting. In the case of starting by using a spark gap, the repetition frequency can be increased to only 500 Hz. In the case of even higher frequencies, the spark gap is no longer extinguished. Again, it is disadvantageous in the case of spark gaps that the response voltage has a certain undesired tolerance. Furthermore, its service life is very limited. The short spacing aimed at here between the individual pulses can thus no longer be achieved when spark gaps are used. Operation of spark gaps in the vicinity of the maximum permissible repetition frequency leads to unacceptable delay times when starting high-pressure discharge lamps.

SIDACs could certainly be operated in principle with a repetition frequency of up to 3 kHz, but other serious disadvantages occur in this case. On the one hand, the breakdown voltage of different SIDACs of a single series varies by approximately 20%, and this leads to a corresponding fluctuation in the starting voltage and, in the case of a specific fraction of the starting circuits, even to failure to switch, while on the other hand there is a need for an expensive circuitry, because the SIDAC can no longer be extinguished when the holding current is exceeded by the charging current. Furthermore, because of the strong temperature dependence of the holding current, starting circuits with SIDACs require expensive precautions. Moreover, with SIDACs the high price is a disadvantage in the equation, since in the case of a conventional starting device, for example, there is already a need for two SIDACs.

According to the invention, starting circuits can be implemented in a particularly simple fashion using an IGBT (Insulated Gate Bipolar Transistor). This component is, for example, described in a different context in Application DE-A 195 48 003, published after the priority date. The IGBT is used there in conjunction with a flyback converter.

The use of IGBTs permits the repetition frequency to be increased as far as an order of magnitude of 3 kHz and more, the result of this being reliable starting by means of pulses whose duration is only 180 ns and less.

The use of IGBTs permits, in addition, the generation of a defined starting voltage, since the starting pulse is generated by switching the collector-emitter voltage $U_{CE}$ of the IGBT. A long service life results in the case of operation within the prescribed specification, since no wear occurs (as does occur in the case of the spark gap). Furthermore, IGBTs are relatively favorable in terms of cost when compared with SIDACs.

Even in the case of lamps which are poor to start, only delay times of at most 20 ms are reached with IGBTs. For comparison: the delay times in the case of the use of SIDACs or spark gaps are in the range of seconds.

Advantageous developments of the invention are described in the additional claims dependent on the main claim.

BRIEF DESCRIPTION OF THE DRAWINGS

Further details, features and advantages follow from an exemplary embodiment which is described in more detail below with reference to the attached drawings, in which.

BEST MODE FOR CARRYING OUT THE INVENTION

Figure 1:
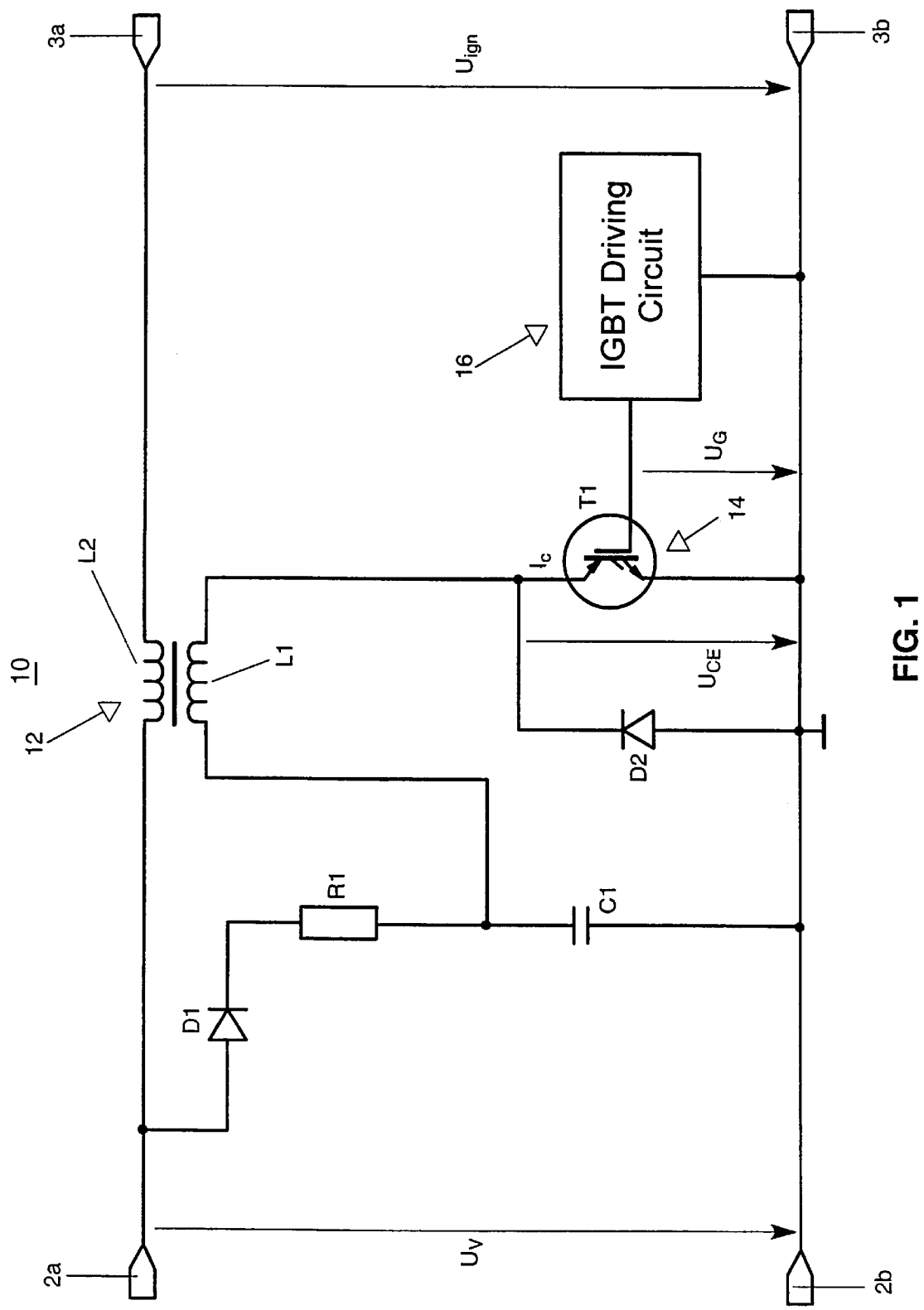
FIG. 1 shows a block diagram of a circuit according to the invention.

The starting circuit 10 represented in FIG. 1 is supplied with a supply voltage $U_v$ via its input terminals 2a and 2b. The supply voltage can be made available by a KVG or an EVG. The high-pressure discharge lamp to be started is connected to the output terminals 3a and 3b of said circuit. The voltage dropping across the output terminals is denoted as the starting voltage $U_{ign}$ of the lamp.

A starting transformer 12 is connected with its secondary side $L_2$ to the lamp to be started. Its primary side $L_1$ is connected to the output circuit of an IGBT 14 and to a capacitor $C_1$. By using an AC voltage $U_v$, the capacitor $C_1$ is charged via a series circuit consisting of a diode $D_1$ and an ohmic resistor $R_1$. In another exemplary embodiment, a separate DC input voltage is used to charge the capacitor $C_1$, with the result that the diode $D_1$ can be eliminated.

A freewheeling diode $D_2$ is connected in parallel to the IGBT 14. The gate terminal of the IGBT 14 is connected to an IGBT driving circuit 16. To generate a starting pulse, the IGBT driving circuit generates a signal which is applied to the gate terminal of the IGBT 14 and has the effect that the IGBT switches, that is to say the collector-emitter voltage $U_{ce}$ returns to zero, as a result of which the capacitor $C_1$ is discharged. This produces a pulse in the primary side $L_1$ of the starting transformer 12, which is transmitted to the secondary side $L_2$ in accordance with the selected transformation ratio. The pulse produced on the secondary side $L_2$ is applied as starting voltage $U_{ign}$ to the high-pressure discharge lamp to be started.

The resistor $R_1$ and the capacitor $C_1$ are dimensioned in accordance with the desired repetition frequency. In one implemented embodiment, the capacitance of the capacitor $C_1$ was 68 nF and the resistance of $R_1$ was 2.2 kΩ. The supply voltage $U_v$ was 350 V AC. The selected IGBT had a maximum collector-emitter voltage $U_{ce}$ of approximately 600 V and a maximum collector current $I_c$ of approximately 20 A. Use was made of IGBTs of type IRGBC20S and IRGBC20U from the International Rectifier company, as well as of type BUP 401 from the Siemens company. Their repetition frequency is at least 2 kHz, and the pulse duration less than 0.5 µs, preferably at least 2.8 kHz or less than 0.25 µs.

A very good starting response was achieved in the case of repetition frequencies of approximately 3 kHz and starting pulse widths of approximately 0.2 µs.

Figure 2:
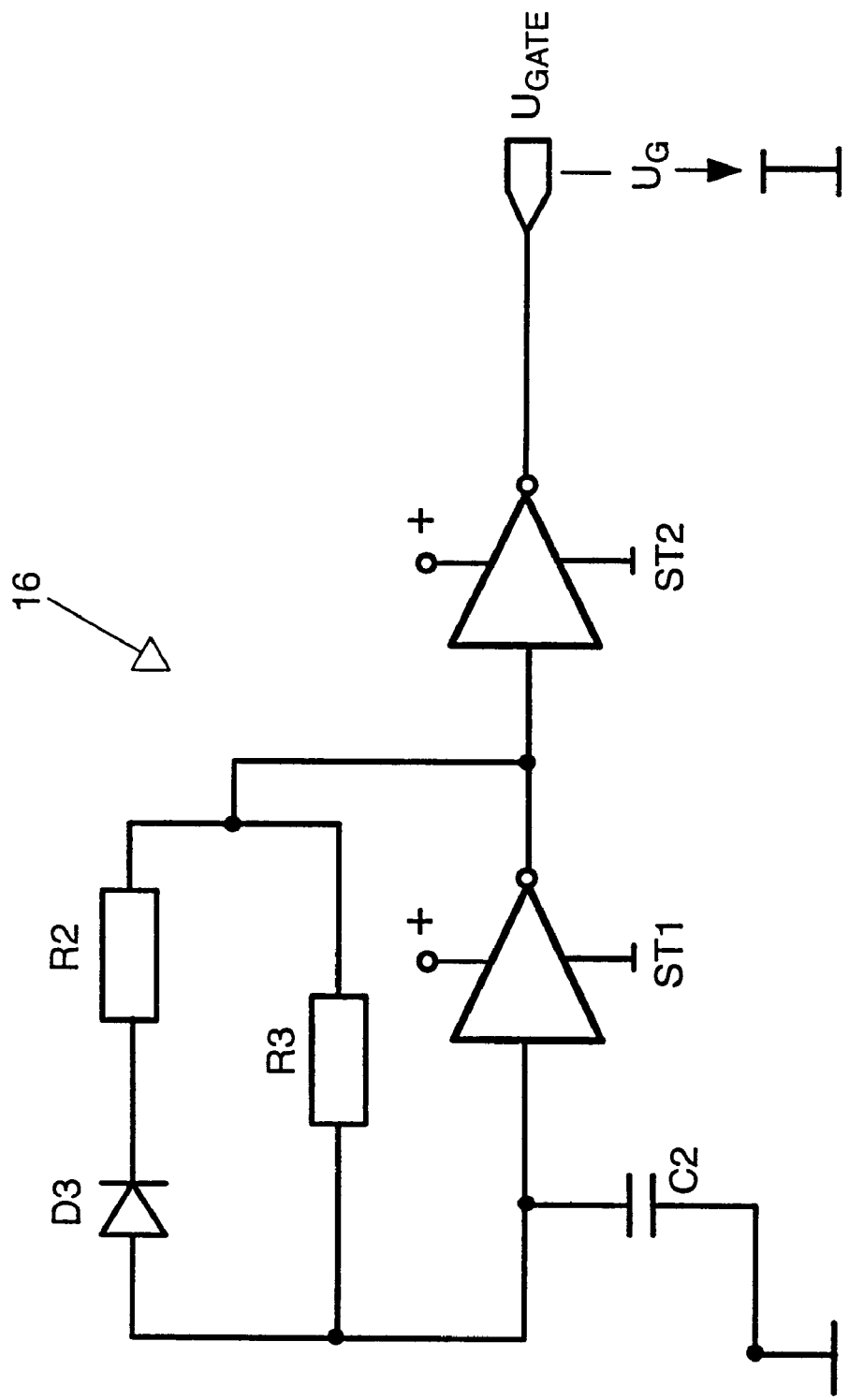
FIG. 2 shows an exemplary embodiment for the circuit for driving the IGBT.

An embodiment of an IGBT driving circuit 16 is represented in more detail in FIG. 2. It comprises a Schmitt trigger inverter $ST_1$ with a feedback network comprising the parallel circuit of the series circuit, consisting of a diode $D_3$ and a resistor $R_2$, and a resistor $R_3$. The input of the Schmitt trigger inverter $ST_1$ is connected to frame via a capacitor $C_2$. The output of $ST_1$ is connected to a further Schmitt trigger inverter $ST_2$ at whose output the gate voltage $U_g$ for driving the IGBT 14 is available.

Figure 3:
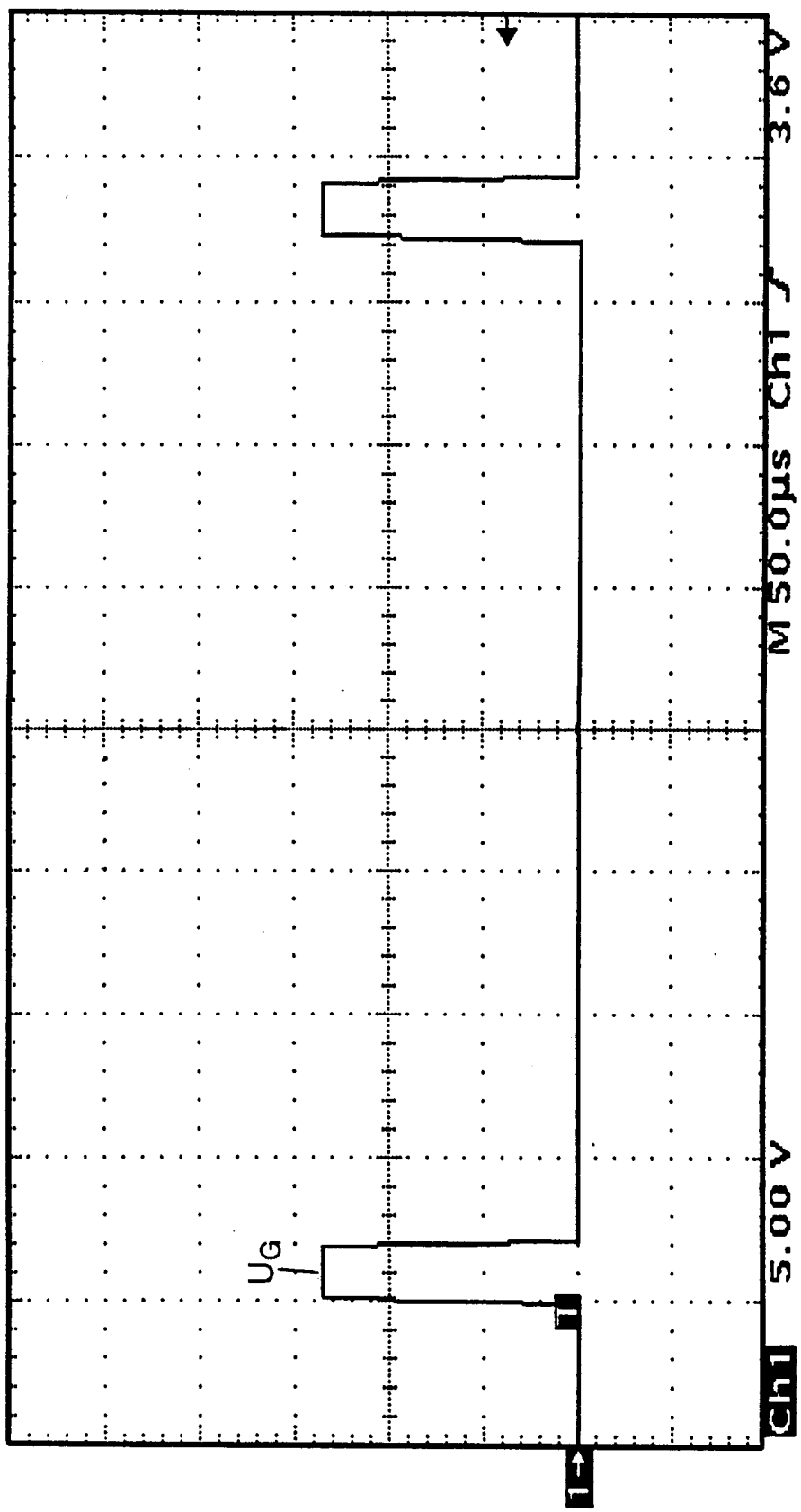
FIG. 3 shows the temporal characteristic of the voltage at the gate of the IGBT.

The temporal characteristic of the gate voltage $U_g$ of the IGBT is represented by way of example in FIG. 3. The width of the square-wave pulse was 20 µs in this example, the repetition frequency was approximately 2.5 kHz, while the maximum voltage of the pulse was about 13.6 V.

Figure 4:
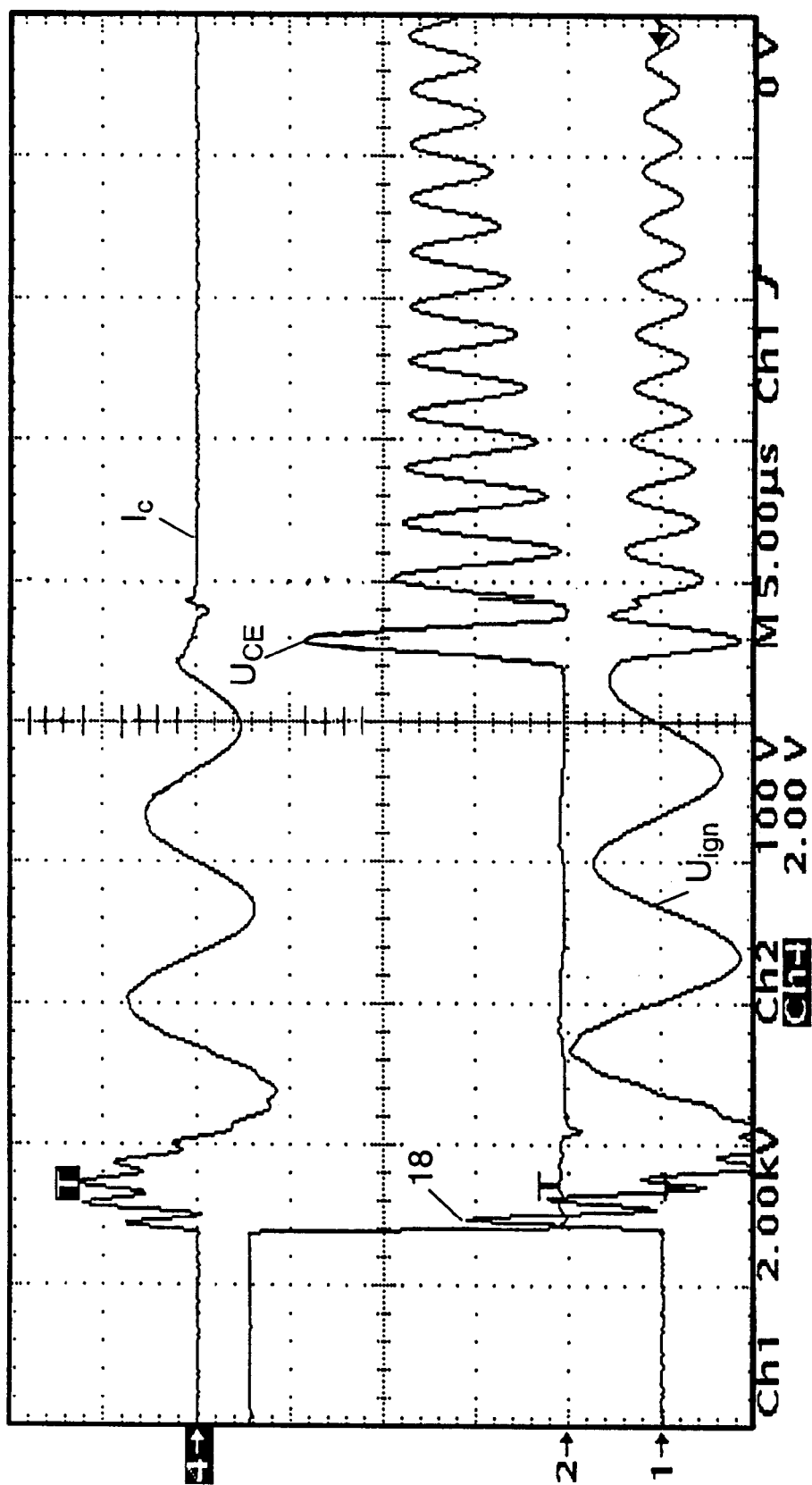
FIG. 4 shows the temporal characteristic of the collector current IC and the collector-emitter voltage $U_{ce}$ of the IGBT, as well as the resultant starting voltage $U_{ign}$.

FIG. 4 shows the temporal characteristic of the collector current $I_c$ and of the collector-emitter voltage $U_{ce}$ of the IGBT 14 as well as the starting voltage $U_{ign}$ during a starting operation, it being required to note here that the output terminals of the starting circuit remained open for the purpose of determining these temporal characteristics. Worthy of note, particularly, is the duration of the peak of the starting voltage $U_{ign}$ denoted by the arrow 18. It is only 190 ns in the present exemplary embodiment.

Figure 5:
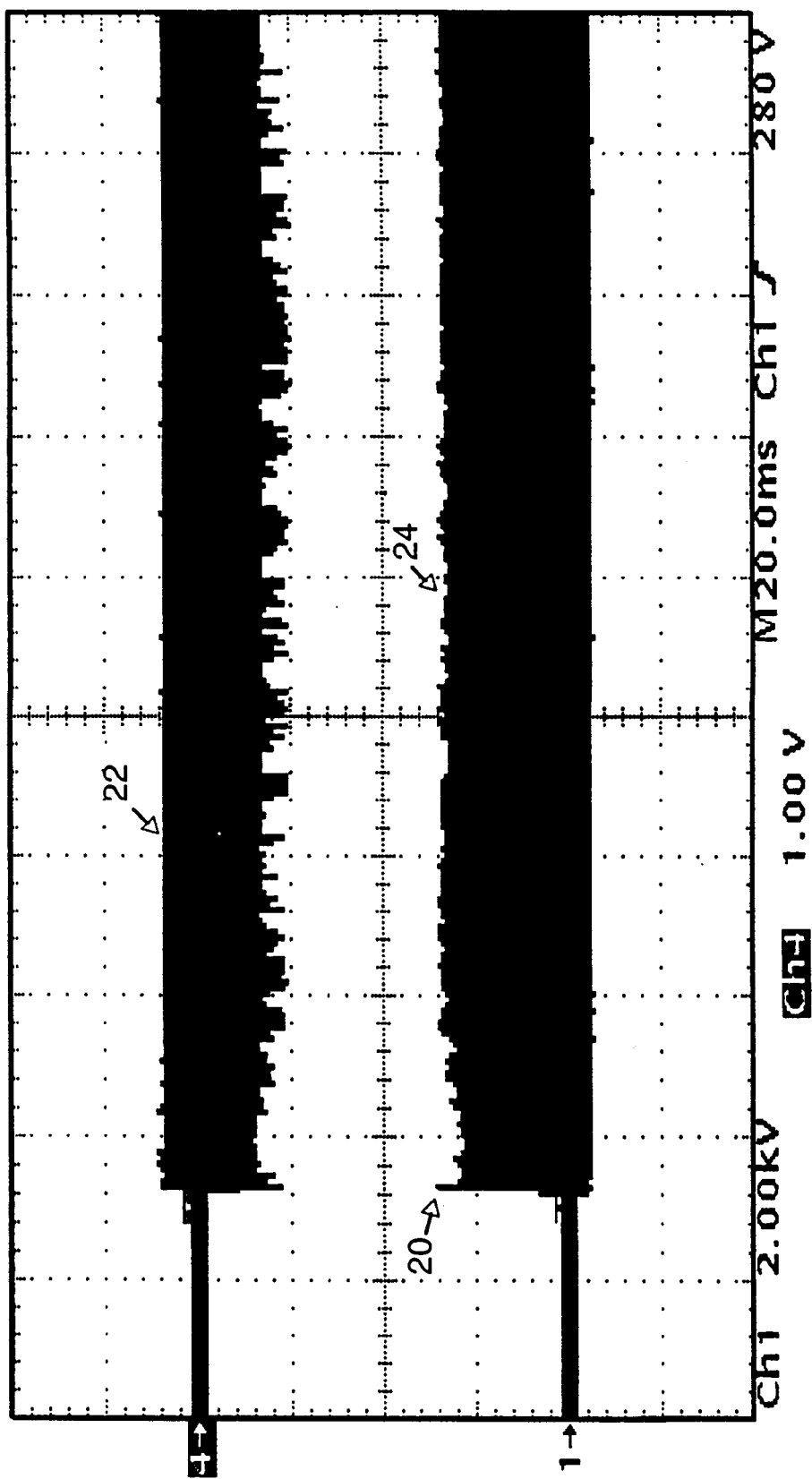
FIG. 5 shows the characteristic of the lamp current and lamp voltage, plotted against time in the neighborhood of a starting pulse.

FIG. 5 shows the temporal characteristic of the lamp current 22 and lamp voltage 24 of a high-pressure discharge lamp which is difficult to start and was driven using the starting circuit described above. The scale of the time axis (20 ms) is particularly worthy of note. Using the starting circuit according to the invention, the first starting pulse (arrow 20) already lead to starting of the lamp. In accordance with the prior art, the starting operation would have lasted, by contrast with this, several seconds, that is to say longer by a factor of a thousand.

What is claimed is:

1. A circuit for starting a high-pressure discharge lamp, comprising a starting transformer (12) whose secondary side ($L_2$) is connected to the lamp to be started, and whose primary side ($L_1$) is connected to a circuit triggering the starting pulse, wherein the circuit triggering the starting pulse generates starting pulses with a repetition frequency of at least 2 kHz and a pulse duration of less than 0.5 μs.

2. The circuit as claimed in claim 1, wherein the circuit triggering the starting pulse comprises at least one IGBT (14).

3. The circuit as claimed in claim 2, wherein the circuit triggering the starting pulse further comprises a driving circuit (16) for triggering a starting pulse the driving circuit (16) generates and applies to the IGBT (14) a signal (UG) which serves to switch the IGBT (14).

4. The circuit as claimed in claim 3, wherein upon switching the IGBT (14) discharges a capacitor (C1), the primary side ($L_1$) of the starting transformer (12) being connected to the capacitor ($C_1$) and the output circuit of the IGBT (14).

5. The circuit as claimed in claim 2, wherein a freewheeling diode ($D_2$) is connected in parallel with the IGBT.

6. The circuit as claimed in claim 1, wherein the circuit triggering the starting pulse generates starting pulses with a repetition frequency of at least 2.8 kHz and a pulse duration of less than 0.25 μs.

7. The circuit as claimed in claim 1, wherein the circuit (10) is fed from a conventional or an electronic ballast.

8. A method for starting a high-pressure discharge lamp, defined by the following steps: charging a capacitor (C1) connected to an output circuit of a switching element (14), the capacitor (C1) and the output circuit of the switching element (14) being connected to, or via the primary side (L1) of a starting transformer (12), driving the switching element (14) with a signal (UG) which triggers switching of the switching element (14), transmitting a pulse produced in the primary side (L1) of the starting transformer (12) to the secondary side (L2) thereof, the pulse having a pulse duration of less than 0.5 μs, and triggering starting in the high-pressure discharge lamp connected to the secondary side (L2) of the transformer (12).

9. The method as claimed in claim 8, wherein the steps of charging, driving and transmitting are repeated until the high-pressure discharge lamp starts, the pulses having a repetition frequency of at least 2 kHz.

10. The method as claimed in claim 8, wherein the switching element (14) is an IGBT.

* * * * *